United States Patent
Ran et al.

(10) Patent No.: US 10,496,865 B2
(45) Date of Patent: Dec. 3, 2019

(54) FINGERPRINT MODULE AND MOBILE TERMINAL

(71) Applicant: SHENZHEN GOODIX TECHNOLOGY CO., LTD., Shenzhen, Guangdong (CN)

(72) Inventors: Rui Ran, Guangdong (CN); Dansheng Chen, Guangdong (CN)

(73) Assignee: SHENZHEN GOODIX TECHNOLOGY CO., LTD., Shenzhen (CN)

(*) Notice: Subject to any disclaimer, the term of this patent is extended or adjusted under 35 U.S.C. 154(b) by 197 days.

(21) Appl. No.: 15/704,065

(22) Filed: Sep. 14, 2017

(65) Prior Publication Data

US 2018/0322323 A1   Nov. 8, 2018

Related U.S. Application Data

(63) Continuation of application No. PCT/CN2017/083276, filed on May 5, 2017.

(51) Int. Cl.
| | |
|---|---|
| *G06K 9/00* | (2006.01) |
| *G01L 9/06* | (2006.01) |
| *G06F 3/041* | (2006.01) |
| *G06F 3/044* | (2006.01) |

(Continued)

(52) U.S. Cl.
CPC .............. *G06K 9/0002* (2013.01); *G01L 9/06* (2013.01); *G06F 1/1684* (2013.01); *G06F 3/041* (2013.01);

(Continued)

(58) Field of Classification Search
CPC ............ G06K 9/0002; G06K 9/00013; G06K 9/00087; H04M 1/026; G06F 3/0412;
(Continued)

(56) References Cited

U.S. PATENT DOCUMENTS

| | | |
|---|---|---|
| 5,559,504 A | 9/1996 | Itsumi et al. |
| 2006/0144154 A1 | 7/2006 | Ueno et al. |

(Continued)

FOREIGN PATENT DOCUMENTS

| | | |
|---|---|---|
| CN | 104731415 A | 6/2015 |
| CN | 105843425 A | 8/2016 |

(Continued)

OTHER PUBLICATIONS

International Search Report (and English translation) for PCT/CN2017/083276 dated Dec. 28, 2017.
(Continued)

*Primary Examiner* — John B Strege
(74) *Attorney, Agent, or Firm* — Heslin Rothenberg Farley & Mesiti P.C.

(57) ABSTRACT

A fingerprint module includes a fingerprint identification chip, a flexible circuit board, and a pressure detection unit. The pressure detection unit includes a rigid substrate and a pressure detection circuit formed on the rigid substrate. The fingerprint identification chip and the pressure detection unit are disposed on two opposite surfaces of the flexible circuit board respectively, and are separately electrically connected to the flexible circuit board, respectively.

20 Claims, 5 Drawing Sheets

(51) Int. Cl.
*H04M 1/02* (2006.01)
*G06F 1/16* (2006.01)

(52) U.S. Cl.
CPC ............ *G06F 3/044* (2013.01); *G06F 3/0412* (2013.01); *G06F 3/0414* (2013.01); *G06K 9/00013* (2013.01); *G06K 9/00087* (2013.01); *H04M 1/026* (2013.01); *G06F 2203/04105* (2013.01); *H04M 2250/12* (2013.01)

(58) Field of Classification Search
CPC .................. G06F 3/044; G06F 3/0414; G06F 2203/04105; G01L 9/06
See application file for complete search history.

(56) References Cited

U.S. PATENT DOCUMENTS

| | | | | |
|---|---|---|---|---|
| 2013/0216860 | A1* | 8/2013 | Imran | ................. C03C 17/3618 428/623 |
| 2014/0285955 | A1* | 9/2014 | Matsumoto | ........... G06F 1/1626 361/679.01 |
| 2017/0372112 | A1* | 12/2017 | Baker | .................. G06K 9/0002 |
| 2018/0307816 | A1* | 10/2018 | Lu | ........................... G06F 21/32 |

FOREIGN PATENT DOCUMENTS

| | | |
|---|---|---|
| CN | 106415459 A | 2/2017 |
| EP | 0561397 A2 | 3/1993 |
| KR | 20050085683 A | 8/2005 |
| KR | 20160143071 A | 12/2016 |
| KR | 20170003369 A | 1/2017 |
| WO | 2016172713 A1 | 10/2016 |

OTHER PUBLICATIONS

Communication pursuant to Rule 164(1) EPC issued by the European Patent Office for European Application No. 17761789.1 dated Feb. 19, 2019.

* cited by examiner

FINGERPRINT MODULE AND MOBILE TERMINAL

CROSS-REFERENCE TO RELATED APPLICATIONS

The present application is a continuation of international application No. PCT/CN2017/083276, filed on May 5, 2017, which is hereby incorporated by reference herein, in its entirety.

TECHNICAL FIELD

The present disclosure relates to biometric identification technologies, and in particular, to a fingerprint module and a mobile terminal.

BACKGROUND

A fingerprint unlocking function is a convenient and practical biometric identification technique, and is widely used in terminal devices such as smartphones and the like. To enhance user experiences, in some existing terminal devices, a pressure sensor function is further integrated into a fingerprint module, so that the fingerprint module can identify a value of the pressure applied on the fingerprint module, and instruct a control chip to trigger a corresponding function according to the value of the pressure.

Generally, the pressure sensor is manufactured based on a flexible circuit board and is usually directly adhered to a lower surface of a reinforcing steel sheet of a fingerprint module via an adhesive. The reinforcing steel sheet is used mainly for improving the strength of the fingerprint module. However, with such a structure, an overall thickness of the fingerprint module is greatly increased (the thickness is increased by at least 0.15 millimeters), which therefore affects an overall thickness of the terminal device and the development towards an ultra-thin device.

SUMMARY

Some embodiments of the present disclosure aim to provide a fingerprint module and a mobile terminal, to decrease the thickness of the fingerprint module integrated with a pressure detection function, which thus reduces an impact of the fingerprint module on an overall thickness of a device, thereby facilitating the development towards an ultra-thin device.

According to an embodiment of the present disclosure, there is provided a fingerprint module including: a fingerprint identification chip, a flexible circuit board and a pressure detection unit. The pressure detection unit includes a rigid substrate and a pressure detection circuit formed on the rigid substrate. The fingerprint identification chip and the pressure detection unit are arranged on two opposite surfaces of the flexible circuit board respectively, and are electrically connected to the flexible circuit board respectively.

According to an embodiment of the present disclosure, there is further provided a mobile terminal. The mobile terminal includes the fingerprint module as described above.

Compared with existing techniques, in the embodiments of the present disclosure, the pressure detection circuit is directly formed on the rigid substrate, and the rigid substrate with the pressure detection circuit replaces a reinforcing steel sheet and a flexible circuit board for manufacturing a pressure sensor in the existing art. This design can not only ensure the achievement of a pressure detection function, but also help to decrease the overall thickness of the fingerprint module and reduce impact of the fingerprint module on the thickness of a device. Moreover, the pressure detection unit is directly adhered on the position of the flexible circuit board corresponding to the fingerprint identification chip, so that the rigid substrate in the pressure detection unit can replace the reinforcing steel sheet in the existing art to provide a rigid support for the fingerprint identification chip and facilitate smooth soldering of the fingerprint identification chip.

Furthermore, the rigid substrate is any one of the following: a ceramic substrate, a polyimide substrate, an epoxy glass fiber substrate, a glass substrate and a quartz substrate. Multiple materials are provided for the rigid substrate, so that in practical applications, it allows a flexible selection of the substrate for disposing the pressure detection circuit upon a practical situation.

Furthermore, the rigid substrate is a zirconium oxide ceramic substrate. The zirconium oxide ceramic has good toughness and hardness, can provide a sufficient rigid support for the fingerprint identification chip in the case that the zirconium oxide ceramic is very thin (the thickness may be less than 0.1 millimeters), and help to further decrease the overall thickness of the fingerprint module.

Furthermore, the zirconium oxide ceramic substrate has a thickness between 0.08 millimeters and 0.1 millimeters. This thickness helps to ensure the strength of the substrate and the rigid support for the fingerprint identification chip. Moreover, this thickness helps to decrease the overall thickness of the fingerprint module, as compared with the existing art in which an arrangement of a reinforcing plate causes the thickness of the entire fingerprint module to be increased by 0.15 millimeters.

Furthermore, the area where a contact of the pressure detection circuit locates is connected to the flexible circuit board via a conductive adhesive; on the surface of the rigid substrate facing the flexible circuit board, other area than the area where the contact locates is connected to the flexible circuit board via an insulation adhesive. It helps to ensure an electrical connection between the pressure detection circuit and the flexible circuit board as the area where the contact locates is covered with the conductive adhesive. It also helps to protect a circuit and secure a connection between the rigid substrate and the flexible circuit board as the other area is covered with the insulation adhesive.

Furthermore, the pressure detection circuit is formed with a half-bridge type piezoresistive sensing unit on the rigid substrate. An example of the pressure detection circuit is provided.

Furthermore, the half-bridge type piezoresistive sensing unit includes two bridge arms connected in series. A resistor unit of one bridge arm is located on the surface of the rigid substrate facing the flexible circuit board; and a resistor unit of the other bridge arm is located on the surface of the rigid substrate away from the flexible circuit board. The resistor units of the respective bridge arms are arranged on different surfaces of the rigid substrate respectively. This can amplify a pressure detection signal and improve accuracy of pressure detection.

Furthermore, the pressure detection circuit is formed with a full-bridge type piezoresistive sensing unit on the rigid substrate. Another example of the pressure detection circuit is provided.

Furthermore, the full-bridge type piezoresistive sensing unit includes two half-bridge type piezoresistive sensing units connected in parallel; each half-bridge type piezoresistive sensing unit includes two bridge arms connected in series; and resistor units of the bridge arms that are diagonally positioned are located on a same surface of the rigid substrate. The resistor units of bridge arms that are diagonally positioned in a pressure detection circuit of a full-bridge topology structure are arranged on a same surface of the rigid substrate. This can amplify a pressure detection signal and improve accuracy of pressure detection.

Furthermore, the pressure detection circuit is formed with a full-bridge type piezoresistive sensing unit on the surface of the rigid substrate facing the flexible circuit board and the surface of the rigid substrate away from the flexible circuit board respectively. Another example of the pressure detection circuit is provided.

Furthermore, the pressure detection circuit is formed on the rigid substrate in any one of the following manners: printing, spraying, and electroplating. Several forming examples of the pressure detection circuit are provided.

BRIEF DESCRIPTION OF THE DRAWINGS

One or more embodiments are exemplarily described by using figures that are corresponding thereto in the accompanying drawings; the exemplary descriptions do not constitute a limitation to the embodiments. Elements with same reference numerals in the accompanying drawings are similar elements. Unless otherwise particularly stated, the figures in the accompanying drawings do not constitute a scale limitation.

DETAILED DESCRIPTION

To make the objectives, technical solutions, and advantages of this disclosure clearer and more comprehensible, the following further describes the disclosure in detail with reference to the accompanying drawings and embodiments. It should be understood that the specific embodiments described herein are merely used to explain the disclosure but are not intended to limit the disclosure.

Figure 1:
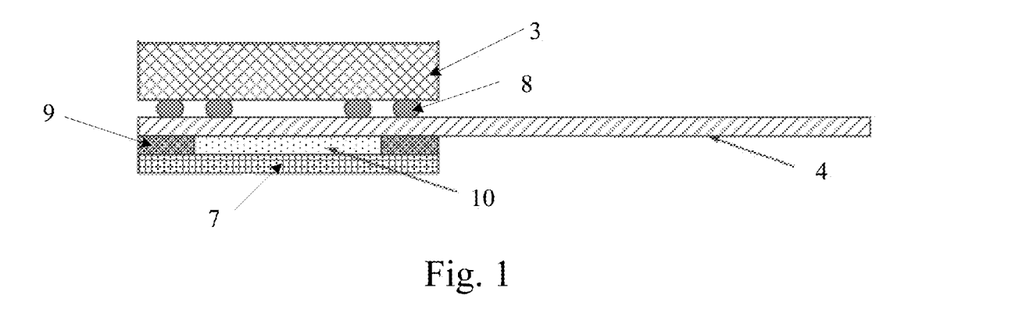
FIG. 1 is a schematic structural diagram of a fingerprint module according to a first embodiment of the present disclosure.

A first embodiment of the present disclosure relates to a fingerprint module. The fingerprint module may be applied to a mobile terminal device such as a mobile phone and a tablet computer and the like. As shown in FIG. 1, the fingerprint module includes a fingerprint identification chip 3, a flexible circuit board 4 and a pressure detection unit 7. The pressure detection unit 7 includes a rigid substrate and a pressure detection circuit formed on the rigid substrate. The fingerprint identification chip 3 and the pressure detection unit 7 are disposed on two opposite surfaces of the flexible circuit board 4 respectively, and are electrically connected to the flexible circuit board 4 respectively. The fingerprint identification chip 3 and the pressure detection unit 7 are positioned to correspond with each other.

In a preferred embodiment, the fingerprint identification chip 3 may be directly soldered on a surface (for example, an upper surface or a top surface) of the flexible circuit board 4 via soldering 8, and the pressure detection unit 7 is directly adhered on another surface (for example, a lower surface or a bottom surface) of the flexible circuit board 4 via a conductive adhesive 9. Moreover, the pressure detection unit 7 may be specifically located right under the fingerprint identification chip 3. This enables the pressure detection unit 7, when a user performs a press type fingerprint input operation with a finger, to directly detect a value of the pressure applied by the user's finger, while the fingerprint identification chip 3 simultaneously performs a corresponding fingerprint detection function.

Figure 3:
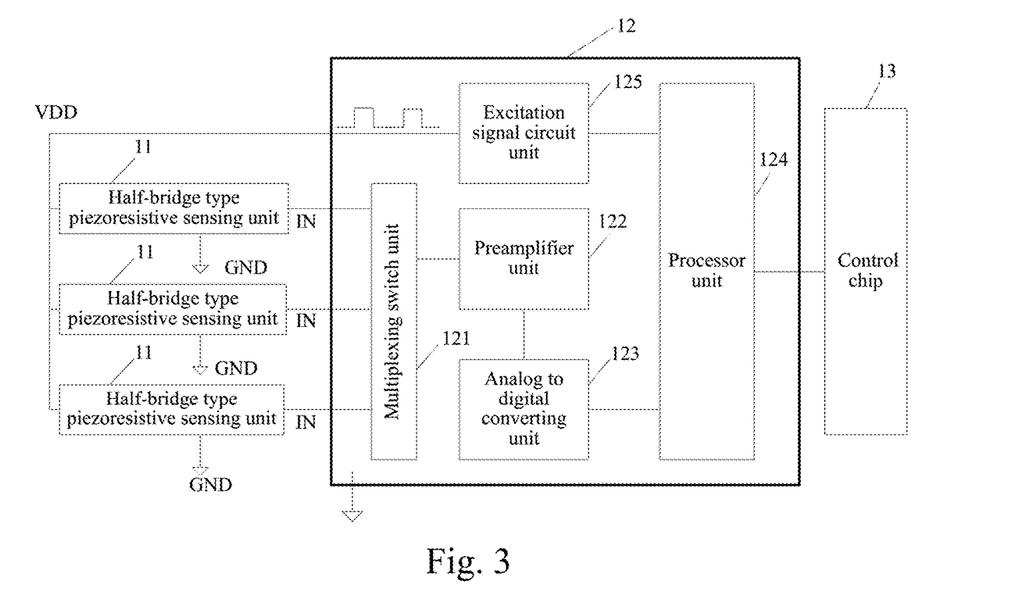
FIG. 3 is a circuit diagram for performing pressure detection by a half-bridge type piezoresistive sensing unit according to the fourth embodiment of the present disclosure.

For example, in this embodiment, as shown in FIG. 3, the fingerprint identification chip 3 and the flexible circuit board 4 are adhered together by soldering, so as to establish an electrical connection between the fingerprint identification chip 3 and the flexible circuit board 4. Specifically, a surface of the flexible circuit board 4 may include a predetermined soldering area. During a soldering operation, the soldering 8 is arranged onto the soldering area to establish an electrical connection between a pin or a connection portion of the fingerprint identification chip 3 and a conductive circuit of the flexible circuit board 4. It is noted that in practical applications the fingerprint identification chip 3 and the flexible circuit board 4 may be fixed in other manners. For example, the fingerprint identification chip 3 and the flexible circuit board 4 may be fixed via a conductive adhesive. Alternatively, a copper-exposed process may be pre-performed on positions of the fingerprint identification chip 3 and the flexible circuit board 4 that need for electrical contacts to form, copper-exposed positions; the copper-exposed positions of the fingerprint identification chip 3 and the flexible circuit board 4 are in direct contact, and other positions may be connected via an insulation adhesive, so that the fingerprint identification chip 3 is securely fixed with the flexible circuit board 4. Generally, a fixing manner can be selected as long as the fingerprint identification chip 3 can be in electrical contact with the flexible circuit board 4, and this embodiment is not limited in this regard.

Moreover, in this embodiment, the pressure detection circuit in the pressure detection unit 7 may be formed on a surface of the rigid substrate by printing, spraying, electroplating, or the like. For example, in one aspect, the pressure detection unit 7 may be adhered on a corresponding surface (i.e. the lower surface) of the flexible circuit board 4 via the conductive adhesive 9 and establish an electrical connection between the pressure detection circuit and the conductive circuit of the flexible circuit board 4. In another aspect, the pressure detection unit 7 may further be adhered on the surface of the flexible circuit board 4 via an insulation adhesive 10.

Specifically, contacts of the pressure detection circuit of the pressure detection unit 7 may be disposed on one surface of the rigid substrate. When the pressure detection circuit is electrically connected to the flexible circuit board 4, the surface where the contact of the pressure detection circuit locates may face the surface of the flexible circuit board 4 away from the fingerprint identification chip 3, and the conductive adhesive 9 is disposed in the area where the contacts are located, so as to establish a connection and fixation between the contacts and the flexible circuit board 4, and further establish the electrical connection between the pressure detection circuit and the flexible circuit board 4. Moreover, on the surface of the rigid substrate facing the flexible circuit board 4, other area than the area where the contacts are located may be connected to the flexible circuit board 4 via the insulation adhesive 10, to secure a connection between the pressure detection unit 7 and the flexible circuit board 4. In practical applications, an electrical contact between the contacts of the pressure detection circuit and the flexible circuit board 4 may alternatively be achieved by soldering.

In practice, the flexible circuit board 4 and the pressure detection unit 7 may firstly be connected to each other via the conductive adhesive 9 and the insulation adhesive 10. After that, the fingerprint identification chip 3 is soldered on the surface of the flexible circuit board 4 away from the pressure detection unit 7, and an adhering position of the fingerprint identification chip 3 on the flexible circuit board 4 corresponds to an adhering position of the pressure detection unit 7 on the flexible circuit board 4. In such an arrangement sequence, the rigid substrate of the pressure detection unit 7 can replace a reinforcing steel sheet that is used in the existing art, to provide a rigid support for the fingerprint identification chip 3 and facilitate smooth soldering of the fingerprint identification chip 3. In addition, the adhering position of the fingerprint identification chip 3 on the flexible circuit board 4 corresponds to the adhering position of the pressure detection unit 7 on the flexible circuit board 4. This can ensure that the pressure detection circuit of the pressure detection unit captures the pressure applied on the fingerprint identification chip more accurately, thereby improving accuracy of a detected pressure.

Compared with existing techniques, in this embodiment, the pressure detection circuit is directly formed on the rigid substrate, and the rigid substrate with the pressure detection circuit replaces the reinforcing steel sheet and a flexible circuit board for manufacturing a pressure sensor in the existing art. Such design can not only achieve a pressure detection function, but also decrease the overall thickness of the fingerprint module and reduce the impact of the fingerprint module on an overall thickness of a device. Moreover, the pressure detection unit is directly adhered on the position of the flexible circuit board corresponding to the fingerprint identification chip, so that the rigid substrate in the pressure detection unit can replace an existing reinforcing steel sheet to provide a rigid support for the fingerprint identification chip, thereby facilitating smooth soldering of the fingerprint identification chip.

A second embodiment of the present disclosure relates to a fingerprint module. This embodiment is based on the first embodiment and further improves a material of the rigid substrate of the pressure detection unit. A main improvement of this embodiment is that the rigid substrate is preferably a ceramic substrate.

Generally, all materials that do not have an electrical feature (that is, non-conductive) but have rigidity and high temperature resistance can serve as the rigid substrate of the pressure detection unit in this embodiment. However, considering the overall thickness of the fingerprint module, this embodiment preferably considers the material for the rigid substrate that provides a sufficient rigid support for the fingerprint identification chip in the case of a thin sheet. The rigid substrate may be, for example, a ceramic substrate, a polyimide (PI) substrate, an epoxy glass fiber (FR4) substrate, a glass substrate, a quartz substrate or the like. Among these substrates, the ceramic substrate has optimal rigidity and a thickness which may be controlled within 0.1 millimeters, which has an effect of further decreasing the overall thickness of the fingerprint module. Therefore, in this embodiment, the rigid substrate of the pressure detection unit is preferably a ceramic substrate.

Compared with the first embodiment, the rigid substrate is preferably a ceramic substrate in this embodiment, which helps to further decrease the overall thickness of the fingerprint module and facilitate the development towards an ultra-thin device, in the case that a rigid support provided for the fingerprint identification chip is guaranteed.

A third embodiment of the present disclosure relates to a fingerprint module. This embodiment is based on the second embodiment, and further improves a material of the ceramic substrate of the pressure detection unit. A main improvement of this embodiment is that the rigid substrate is preferably a zirconium oxide ceramic substrate.

Specifically, the zirconium oxide ceramic has high hardness, good rigidity, and strong toughness, is less easily to be damaged, which helps to prolong a service life of the fingerprint module. The thickness of the zirconium oxide ceramic substrate may be controlled between 0.08 millimeters and 0.1 millimeters. This thickness can ensure the strength of the rigid substrate, and ensure a sufficient rigid support for the fingerprint identification chip. Moreover, this thickness has an effect of decreasing the overall thickness of the fingerprint module, as compared with the existing art in which an arrangement of a reinforcing plate is disposed to increase the thickness of the entire fingerprint module by at least 0.15 millimeters.

Compared with the second embodiment, the rigid substrate is preferably a zirconium oxide ceramic substrate in the embodiment, which can prolong the service life of the fingerprint module. Moreover, it can also decrease the overall thickness of the fingerprint module as the zirconium oxide ceramic substrate is controlled between 0.08 millimeters and 0.1 millimeters.

In addition, this embodiment may be used as an improvement based on the first embodiment, to achieve a same technical effect.

A fourth embodiment of the present disclosure relates to a fingerprint module. The fourth embodiment is based on the third embodiment, and further improves the structure of the pressure detection circuit formed on the rigid substrate.

Figure 2:
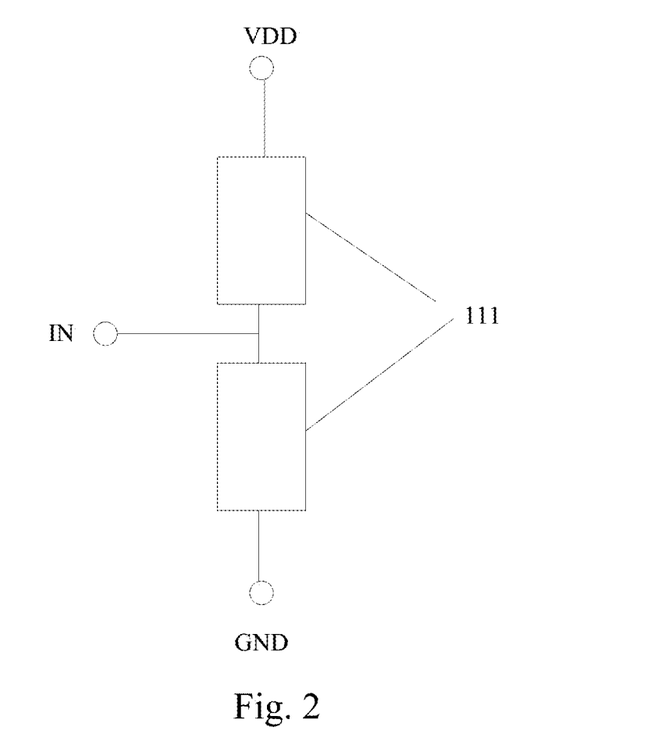
FIG. 2 is a schematic structural diagram of a half-bridge type piezoresistive sensing unit according to a fourth embodiment of the present disclosure.

In this embodiment, the pressure detection circuit is of a half-bridge topology structure on the rigid substrate. Specifically, the pressure detection circuit is formed with a half-bridge type piezoresistive sensing unit on the rigid substrate. As shown in FIG. 2, the half-bridge type piezoresistive sensing unit includes two bridge arms 111 connected in series. An open terminal of one bridge arm 111 leads to an excitation signal applying terminal (VDD), an open terminal of the other bridge arm 111 leads to a ground terminal (GND), and a connection portion of the two bridge arms 111 leads to a signal collection terminal (IN). The signal collection terminal, the excitation signal applying terminal, and the ground terminal may be used as the contacts of the pressure detection circuit and deployed on the surface of the rigid substrate facing the flexible circuit board 4. Each bridge arm 111 may include at least one resistor unit, and the two bridge arms 111 have the same number of resistor units.

As shown in FIG. 3, the signal collection terminal of the half-bridge type piezoresistive sensing unit 11 may be connected to a multiplexing switch unit 121 in a detection chip 12. For example, the signal collection terminal is connected to a preamplifier unit 122 in the detection chip 12 via the multiplexing switch unit 121, and is then further connected to a control chip 13 through an analog-to-digital converting circuit unit 123 and a processor unit 124 in the detection chip 12 sequentially. The excitation signal applying terminal of the half-bridge type piezoresistive sensing unit 11 is connected to an excitation signal circuit unit 125 in the detection chip 12, and the excitation signal circuit unit 125 applies a voltage to the excitation signal applying terminal. The excitation signal circuit unit 125 is further connected to the processing unit 124. When a pressure is applied on the fingerprint module, values of resistances of the two bridge arms 111 change, and a voltage dividing ratio of the two bridge arms 111 changes accordingly. Once the voltage dividing ratio changes, a magnitude of a signal of the signal collection terminal led from the connection portion of the two bridge arms 111 changes inevitably. Therefore, the detection chip 12 may calculate the value of the pressure by detecting a change of the signal of the signal collection terminal.

It is noted that FIG. 3 illustrates multiple half-bridge type piezoresistive sensing units 11 are used and connected to the detection chip 12 together, with this configuration, the multiplexing switch unit 121 is provided in the detection chip 12 for controlling turn-on and turn-off states of the multiple half-bridge type piezoresistive sensing units. However, in this embodiment, the rigid substrate may be provided with only one half-bridge type piezoresistive sensing unit.

In addition, resistance drifts of the resistors of the two bridge arms caused by a temperature effect are close. Therefore, when the temperature changes, the voltage dividing ratio of the two bridge arms basically remains unchanged. As such, when the temperature changes, the change of the signal of the signal collection terminal is very limited, so that the pressure detection circuit with this structure enables to inhibit the effect of a temperature drift.

Compared with the third embodiment, this embodiment provides a structure of the pressure detection circuit. This structure can inhibit the effect of the temperature drift and improve accuracy of pressure detection.

In practical applications, this embodiment may be used as an improvement based on the first or the second embodiment, to achieve a same technical effect.

A fifth embodiment of the present disclosure relates to a fingerprint module. This embodiment is based on the fourth embodiment, and further improves a structure of the pressure detection circuit formed on the rigid substrate. A main improvement of this embodiment is that the pressure detection circuit is formed with a full-bridge type piezoresistive sensing unit on the rigid substrate.

Figure 4:
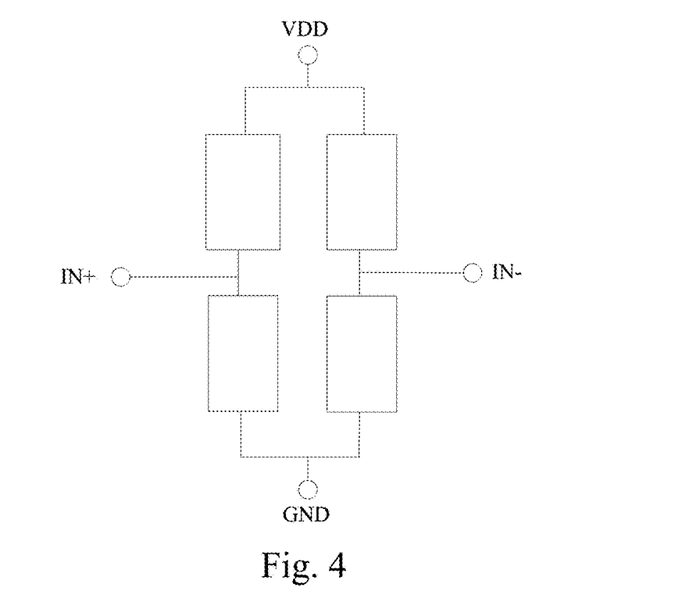
FIG. 4 is a schematic structural diagram of a full-bridge type piezoresistive sensing unit according to a fifth embodiment of the present disclosure.
Figure 5:
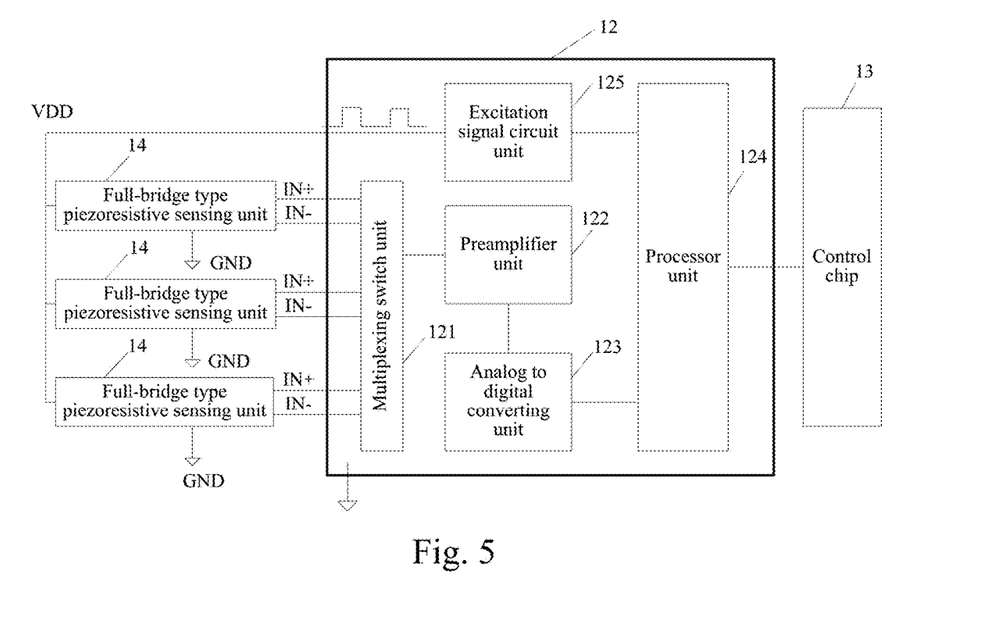
FIG. 5 is a circuit diagram for performing pressure detection by a full-bridge type piezoresistive sensing unit according to the fifth embodiment of the present disclosure.

In this embodiment, the pressure detection circuit is of a full-bridge topology structure. Specifically, the pressure detection circuit is formed with a full-bridge type piezoresistive sensing unit on the rigid substrate. As shown in FIG. 4, the full-bridge type piezoresistive sensing unit may be formed by two half-bridge type piezoresistive sensing units connected in parallel. Excitation signal applying terminals of the two half-bridge type piezoresistive sensing units are connected to each other, ground terminals thereof are also connected to each other, and two signal collection terminals serve as differential signal input terminals IN+ and IN− respectively. The two differential signal input terminals may be connected to a detection chip 12 respectively (as shown in FIG. 5). It can be seen that the full-bridge type piezoresistive sensing unit 14 has four lead terminals, which are four contacts of the pressure detection circuit 7.

The two half-bridge type piezoresistive sensing units are taken, for example, as a first half-bridge type piezoresistive sensing unit and a second half-bridge type piezoresistive sensing unit respectively. When a pressure is applied on the fingerprint module, values of resistances of two bridge arms in the first half-bridge type piezoresistive sensing unit changes, and a voltage dividing ratio of the two bridge arms changes accordingly. Similarly, values of resistances of two bridge arms in the second half-bridge type piezoresistive sensing unit changes, and a voltage dividing ratio of the two bridge arms also changes accordingly. Generally, a variant of the voltage dividing ratio of the two bridge arms in the first half-bridge type piezoresistive sensing unit is not the same as a variant of the voltage dividing ratio of the two bridge arms in the second half-bridge type piezoresistive sensing units, therefore, a differential signal between IN+ and IN− also changes. That is, when a pressure is applied on the fingerprint module, a magnitude of the differential signal between IN+ and IN− is also affected. Therefore, the detection chip may calculate the value of the pressure by detecting the change of the differential signal between IN+ and IN−.

In practical applications, full-bridge type piezoresistive sensing units of the pressure detection circuit may alternatively be formed on the surface of the rigid substrate facing the flexible circuit board and the surface of the rigid substrate away from the flexible circuit board respectively.

Compared with the fourth embodiment, this embodiment provides another structure of the pressure detection circuit.

In practical applications, this embodiment may be an improvement based on the first, the second or the third embodiment, to achieve a same technical effect.

A sixth embodiment of the present disclosure relates to a fingerprint module. This embodiment is based on the fourth embodiment or the fifth embodiment, and further improves a deployment of resistor units of the pressure detection circuit on the rigid substrate. A main improvement of this embodiment lies in that, the resistor units of the pressure detection circuit are deployed on the surface of the rigid substrate facing the flexible circuit board and the surface of the rigid substrate away from the flexible circuit board respectively.

In this embodiment, for example, a full-bridge type piezoresistive sensing unit includes four resistor units (that is, each bridge arm includes one resistor unit). However, it should be noted that in practical applications, each bridge arm is not limited to including one resistor unit, and may include two or more resistor units connected in series. In addition, in practical applications, as long as the resistance of the resistor unit permits, each bridge arm may be formed with two resistor units connected in parallel. This embodiment is not limited in this regard.

Figure 6:
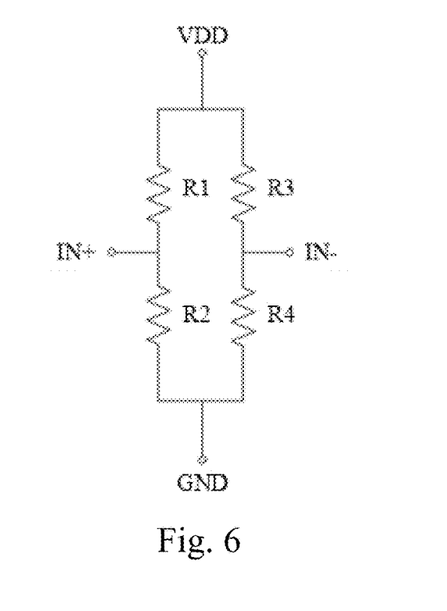
FIG. 6 is a schematic circuit diagram of an equivalent resistor of a full-bridge type piezoresistive sensing unit that includes four resistor units according to a sixth embodiment of the present disclosure.
Figure 7:
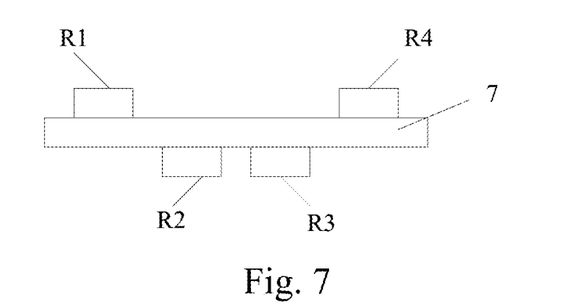
FIG. 7 is a schematic diagram in which resistor units of bridge arms that are diagonally positioned are arranged on a same surface of a rigid substrate according to the sixth embodiment of the present disclosure.
Figure 8:
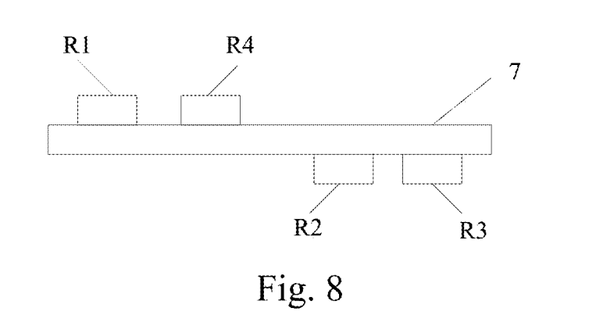
FIG. 8 is another schematic diagram in which resistor units of bridge arms that are diagonally positioned are arranged on a same surface of a rigid substrate according to the sixth embodiment of the present disclosure.

As shown in FIG. 6, assuming that the four resistor units are R1, R2, R3, and R4 respectively. R1 and R2 are resistor units of two bridge arms in a same half-bridge type resistance sensing unit, while R3 and R4 are resistor units of two bridge arms in another half-bridge type resistance sensing unit. When the resistor units are deployed, if the resistor units R1 and R2 are deployed on a same surface, when a same deformation is applied to the two resistor units, changes of the two resistor units are nearly the same, thereby causing a relatively small voltage dividing ratio at IN+, and generating a relatively small magnitude of signal. Similarly, if the R3 and R4 are deployed on a same surface, when a same deformation is applied to R3 and R4, a change of a signal of IN− is the same as that of IN+. In contrast, if R1 and R2 are arranged on different surfaces, when a same deformation is applied to the R1 and R2, a difference of the changes of R1 and R2 is amplified, and a change amount at IN+ is also amplified, so as to amplify a signal change amount. Similarly, when R3 and R4 are located on different surfaces, a signal change amount at IN− is also amplified. Moreover, if R1 and R3 that are symmetrically located are arranged on one surface of the rigid substrate, and R2 and R4 that are symmetrically located are arranged on another surface of the rigid substrate, signal change amounts at IN+ and IN− are amplified in a same proportion, and a differential signal between IN+ and IN− is still weak. Therefore, it may be considered that the resistor units R1 and R4 that are at diagonal bridge arms are arranged on one surface of the rigid substrate, and the resistor units R3 and R2 that are at diagonal bridge arms are arranged on another surface of the rigid substrate (as shown in FIG. 7 and FIG. 8). In this way, the differential signal between IN+ and IN− can be amplified, and the signal variant is amplified.

That is, for a pressure detection circuit of a full-bridge topology structure, resistor units of bridge arms that are diagonally positioned may be arranged on a same surface of the rigid substrate, to amplify the differential signal between IN+ and IN−, i.e., to amplify a pressure detection signal, so as to improve sensitivity of pressure detection, and accuracy of pressure detection.

Similarly, for a pressure detection circuit of a half-bridge type topology structure, a resistor unit of one bridge arm may be directly arranged on the surface of the rigid substrate facing the flexible circuit board, and a resistor unit of the other bridge arm may be arranged on the surface of the rigid substrate away from the flexible circuit board, to amplify a pressure detection signal (that is, to amplify a signal of the signal collection terminal).

Compared with the fourth or the fifth embodiment, in this embodiment, resistor units of bridge arms that are diagonally positioned in the pressure detection circuit of the full-bridge topology structure are arranged on a same surface of the rigid substrate, and resistor units of different bridge arms in the pressure detection circuit of the half-bridge topology structure are arranged on different surfaces of the rigid substrate respectively. This can amplify a pressure detection signal, thereby improving accuracy of pressure detection.

Figure 9:
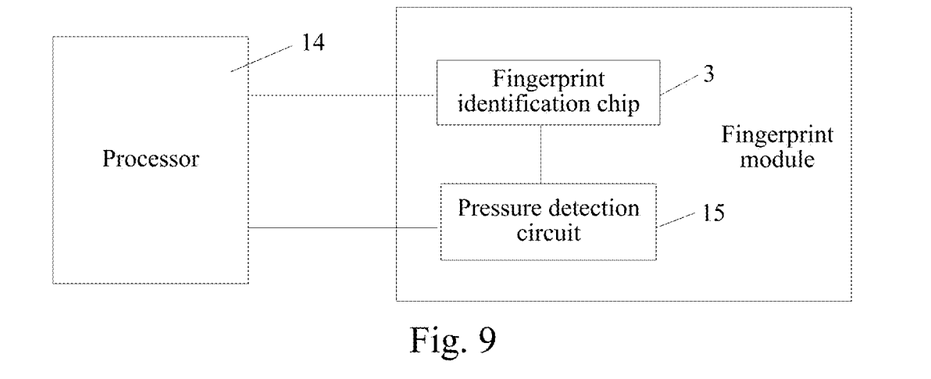
FIG. 9 is a structural block diagram of a mobile terminal according to a seventh embodiment of the present disclosure.

A seventh embodiment of the present disclosure relates to a mobile terminal. As shown in FIG. 9, the mobile terminal includes a processor and the fingerprint module according to any one of the foregoing embodiments.

Both the fingerprint identification chip 3 and the pressure detection circuit 15 in the fingerprint module are connected to a processor 14 (which may be an MCU control chip or a CPU). When an external object (such as a finger of a person) is placed on a predetermined fingerprint identification area, the fingerprint identification chip 3 in the fingerprint module may collect a fingerprint of the foreign object, and transmits the collected fingerprint to the processor 14. The processor 14 may match the collected fingerprint with a pre-stored fingerprint. The pressure detection circuit 15 may detect a value of the pressure applied on the fingerprint identification area, and send a detection result to the processor 14. If the collected fingerprint matches with the pre-stored fingerprint successfully, the processor 14 may determine, according to the value of the detected pressure, a function corresponding to the pressure, and trigger an operation corresponding to the function.

In practical applications, it may be that: the pressure detection circuit performs pressure detection after the collected fingerprint matches with the pre-stored fingerprint successfully; or the pressure detection circuit performs pressure detection when the external object is placed on the predetermined fingerprint identification area. This embodiment is not limited in this regard.

An eighth embodiment of the present disclosure relates to a mobile terminal. This embodiment is based on the seventh embodiment, and further improves an installation position of the fingerprint module in the mobile terminal.

Figure 10:
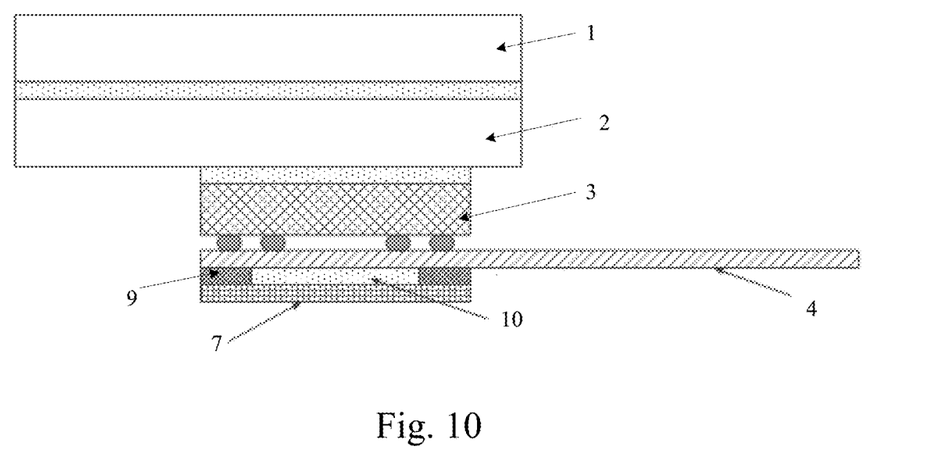
FIG. 10 is a schematic structural diagram in which a cover is connected to a fingerprint module according to an eighth embodiment of the present disclosure.

As shown in FIG. 10, in this embodiment, the mobile terminal further includes a cover 1. The cover 1 may be disposed above the fingerprint module, that is, the fingerprint module is disposed below the cover 1. Assuming that a top surface of the cover 1 serves as a touch surface, the fingerprint module is disposed adjacent to a side of a bottom surface of the cover 1. In a schematic diagram shown in FIG. 10 in which the cover is connected to the fingerprint module, an OLED display panel 2 is disposed between the cover 1 and the fingerprint identification chip 3. That is, the fingerprint module is disposed below the OLED display panel 2. However, in practical applications, the OLED display panel is not essential. That is, the cover 1 and the fingerprint identification chip 3 may be adhered together via an adhesive. A fingerprint identification area is predefined at the top surface of the cover 1. When an external object is applied on the fingerprint identification area, the fingerprint identification chip 3 is triggered to collect a fingerprint of the external object applied on the fingerprint identification area, and send the collected fingerprint to a processor for fingerprint matching. Similarly, when an external force is applied on the fingerprint identification area of the cover 1, the pressure detection circuit is triggered to detect a value of the pressure applied on the fingerprint identification area.

When the fingerprint module is arranged at the back of a display, and the fingerprint identification chip faces the display, a protection board of the display may directly serve as the cover. In this case, an identifier may be provided in the area where the fingerprint module locates, to remind a user the location of the fingerprint identification area. This arrangement can ensure completeness of the device. In practical applications, a back housing of the mobile terminal may alternatively be used as the cover. In this case, the fingerprint module is still disposed at the back of the display, and the fingerprint identification chip is arranged to face the back housing. Alternatively, the fingerprint module and a HOME key may be integrated together. In this case, an outer housing of the HOME key may serve as the cover.

Compared with the seventh embodiment, this embodiment provides an installation position for the fingerprint module on the mobile terminal.

Persons of ordinary skill in the art can understand that the foregoing embodiments are specific examples for implementing this application, and various changes may be made to the forms and details of the embodiments in practical applications without departing from the spirit and scope of this disclosure.

What is claimed is:

1. A fingerprint module, comprising:
a fingerprint identification chip;
a flexible circuit board; and
a pressure detection unit;
wherein the pressure detection unit comprises a rigid substrate and a pressure detection circuit formed on the rigid substrate; and
wherein the fingerprint identification chip and the pressure detection unit are arranged on two opposite surfaces of the flexible circuit board, respectively, and are electrically connected to the flexible circuit board, respectively.

2. The fingerprint module according to claim 1, wherein the rigid substrate is any one of the following: a ceramic substrate, a polyimide substrate, an epoxy glass fiber substrate, a glass substrate, and a quartz substrate.

3. The fingerprint module according to claim 2, wherein the rigid substrate comprises a zirconium oxide ceramic substrate.

4. The fingerprint module according to claim 3, wherein the zirconium oxide ceramic substrate has a thickness in a range between 0.08 millimeters and 0.1 millimeters.

5. The fingerprint module according to claim 1, wherein: a contact area, where contacts of the pressure detection circuit are located, is connected to the flexible circuit board via a conductive adhesive; and on a surface of the rigid substrate facing the flexible circuit board, an other area than the contact area is connected to the flexible circuit board via an insulation adhesive.

6. The fingerprint module according to claim 1, wherein the pressure detection unit is arranged at a position of the flexible circuit board corresponding to the fingerprint identification chip.

7. The fingerprint module according to claim 1, wherein the pressure detection circuit comprises a half-bridge piezoresistive sensing unit on the rigid substrate.

8. The fingerprint module according to claim 7, wherein the half-bridge piezoresistive sensing unit comprises two bridge arms connected in series, wherein: a resistor unit of one bridge arm is located on a surface of the rigid substrate facing the flexible circuit board; and a resistor unit of the other bridge arm is located on a surface of the rigid substrate away from the flexible circuit board.

9. The fingerprint module according to claim 1, wherein the pressure detection circuit comprises a full-bridge piezoresistive sensing unit on the rigid substrate.

10. The fingerprint module according to claim 9, wherein the full-bridge piezoresistive sensing unit comprises two half-bridge piezoresistive sensing units connected in parallel; each half-bridge piezoresistive sensing unit comprises two bridge arms connected in series; and resistor units of the bridge arms that are diagonally positioned are located on a same surface of the rigid substrate.

11. The fingerprint module according to claim 1, wherein the pressure detection circuit is formed with full-bridge piezoresistive sensing units on a surface of the rigid substrate facing the flexible circuit board and a surface of the rigid substrate away from the flexible circuit board, respectively.

12. The fingerprint module according to claim 1, wherein the pressure detection circuit is formed on the rigid substrate in any one of the following manners: printing, spraying, and electroplating.

13. A mobile terminal, comprising a fingerprint module, the fingerprint module comprising:
a fingerprint identification chip;
a flexible circuit board; and
a pressure detection unit;
wherein the pressure detection unit comprises a rigid substrate and a pressure detection circuit formed on the rigid substrate; and
wherein the fingerprint identification chip and the pressure detection unit are arranged on two opposite surfaces of the flexible circuit board, respectively, and are electrically connected to the flexible circuit board, respectively.

14. The mobile terminal according to claim 13, wherein the mobile terminal further comprises a cover, and the cover is disposed above the fingerprint module.

15. The mobile terminal according to claim 14, wherein the mobile terminal further comprises a display panel, and the display panel is disposed between the cover and the fingerprint module.

16. The mobile terminal according to claim 13, wherein the rigid substrate is any one of the following: a ceramic substrate, a polyimide substrate, an epoxy glass fiber substrate, a glass substrate, and a quartz substrate.

17. The mobile terminal according to claim 13, wherein the rigid substrate comprises a zirconium oxide ceramic substrate.

18. The mobile terminal according to claim 17, wherein the zirconium oxide ceramic substrate has a thickness in a range between 0.08 millimeters and 0.1 millimeters.

19. The mobile terminal according to claim 13, wherein a contact area, where contacts of the pressure detection circuit are located, is connected to the flexible circuit board via a conductive adhesive; and on a surface of the rigid substrate facing the flexible circuit board, an other area than the contact area is connected to the flexible circuit board via an insulation adhesive.

20. The fingerprint module according to claim 13, wherein the pressure detection unit is arranged at a position of the flexible circuit board corresponding to the fingerprint identification chip.

* * * * *